(12) United States Patent  
Niuwenhuys et al.

(10) Patent No.: US 10,127,007 B2  
(45) Date of Patent: Nov. 13, 2018

(54) DETERMINING THE IDENTITY OF A USER IN STATELESS DEVICES FOR THE CUSTOMIZATION OF AUDIO CONTENT FOR THE USER

(71) Applicant: AdsWizz Inc., San Mateo, CA (US)

(72) Inventors: Bruno Niuwenhuys, Sunnyvale, CA (US); Bogdan Bocşe, Bucharest (RO); Mihai Ciurea, Bucharest (RO); Caba Ciprian, Bucharest (RO); Guzik Dumitru Florin, Slobozia (RO)

(73) Assignee: ADSWIZZ INC., San Mateo, CA (US)

( * ) Notice: Subject to any disclaimer, the term of this patent is extended or adjusted under 35 U.S.C. 154(b) by 0 days.

(21) Appl. No.: 15/338,230

(22) Filed: Oct. 28, 2016

(65) Prior Publication Data

US 2017/0351482 A1   Dec. 7, 2017

(30) Foreign Application Priority Data

Jun. 1, 2016   (RO) .............................. A/00401/2016

(51) Int. Cl.
 *H04B 3/00*   (2006.01)
 *G06F 3/16*   (2006.01)
 (Continued)

(52) U.S. Cl.
 CPC ............ *G06F 3/165* (2013.01); *H04L 65/602* (2013.01); *H04L 67/20* (2013.01); *H04L 67/303* (2013.01);
 (Continued)

(58) Field of Classification Search
 CPC ....... H04L 67/10; H04L 65/602; H04L 67/20; H04L 67/303; H04L 21/233;
 (Continued)

(56) References Cited

U.S. PATENT DOCUMENTS 6,505,169 B1   1/2003   Bhagavath et al.
8,683,547 B2   3/2014   Apparao et al.
(Continued)

OTHER PUBLICATIONS

PCT International Search Report and Written Opinion, PCT Application No. PCT/US2016/061655, dated Jan. 6, 2017, 12 pages.

*Primary Examiner* — Quynh Nguyen
(74) *Attorney, Agent, or Firm* — Fenwick & West LLP

(57) ABSTRACT

A content replacement system detects a start of a content replacement break in a content stream provided to a client device. The system selects one or more of a plurality of content replacement parts. The system computes a retargeting probability for each of the selected content replacement parts, the retargeting probability based on collected information stored in a profile database, the collected information including a number of times that requests for content replacement parts have been associated with a network address and device identifier of the client device. The system modifies a content score of each of the selected content replacement parts by the corresponding retargeting probability. The system ranks the selected content replacement parts based on the modified content scores, inserts one or more of the highest ranked selected content replacement parts into the content stream, and transmits the modified content stream to the client device.

20 Claims, 5 Drawing Sheets

(51) Int. Cl.
*H04L 29/06* (2006.01)
*H04L 29/08* (2006.01)
*H04N 21/233* (2011.01)
*H04N 21/258* (2011.01)
*H04N 21/2668* (2011.01)
*H04N 21/475* (2011.01)

(52) U.S. Cl.
CPC ......... *H04N 21/233* (2013.01); *H04N 21/258* (2013.01); *H04N 21/2668* (2013.01); *H04N 21/4756* (2013.01)

(58) Field of Classification Search
CPC ............... H04L 21/258; H04L 21/2668; H04L 21/4756; G06F 3/165
USPC ............................................ 381/77; 709/203
See application file for complete search history.

(56) References Cited

U.S. PATENT DOCUMENTS

| | | |
|---|---|---|
| 8,996,712 B2 | 3/2015 | Green et al. |
| 2007/0204310 A1 | 8/2007 | Hua et al. |
| 2014/0181243 A1 | 6/2014 | Nieuwenhuys |
| 2014/0259059 A1 | 9/2014 | Evans et al. |
| 2015/0052196 A1 | 2/2015 | Emerson |

DETERMINING THE IDENTITY OF A USER IN STATELESS DEVICES FOR THE CUSTOMIZATION OF AUDIO CONTENT FOR THE USER

CROSS REFERENCE TO RELATED APPLICATION

This application claims the benefit of Romanian App. No. A/00401/2016, filed Jun. 1, 2016, which is hereby incorporated by reference in its entirety.

TECHNICAL FIELD

The disclosure generally relates to the field of real-time audio processing, and specifically to determining the identity of a user in stateless devices for the customization of audio content for the user.

BACKGROUND

One type of distribution of content items popular on the Internet is the distribution of audio streams to listeners, i.e., digital radio. However, with the introduction of various digital radio enabled devices beyond the traditional radio, a unique challenge arises in regards to the identification of the listener that is using the digital radio device. In particular, listeners may access an audio stream from a variety of devices. For example, a listener may access an audio stream from a digital radio device in his or her car, and then access the same stream on a mobile device, and then access the stream via multiple digital radio enabled devices at the listener's home or work. Some of these devices may be special-purpose electronics devices that do not include any storage, and may not include any means of unique identification, as they may be inexpensively made, i.e., these devices may be state-less.

However, as digital radio may be individually streamed to each listener, an opportunity arises to be able to customize the audio stream that is delivered to each user. This increases the likelihood of higher satisfaction and repeat consumption by listeners of the audio stream. However, as noted above the digital radio devices may be state-less, which means that a challenge arises when identifying the identity of the listener using the digital radio device, and in turn, an challenge in ensuring the same customized audio stream for the listener.

Thus, what was lacking, inter alia, was an ability for determining with substantial certainty the identity of listeners among different, possibly stateless, digital radio capable devices.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system for determining the identity of a user in stateless devices for the customization of audio content for the user. In one embodiment, a content replacement system detects a start of a content replacement break in a content stream provided to a client device. The content replacement system selects one or more of a plurality of content replacement parts. The system further computes a retargeting probability for each of the selected content replacement parts, the retargeting probability based on a number of times that requests for content replacement parts have been associated with a network address and device identifier of the client device. The content score of each of the selected content replacement parts is modified by the corresponding retargeting probability computed for the selected content replacement part. The selected content replacement parts are ranked based on the modified content scores. The one or more of the highest ranked selected content replacement parts are inserted into the content stream. The content stream is transmitted by the system to the client device.

Figure 1:
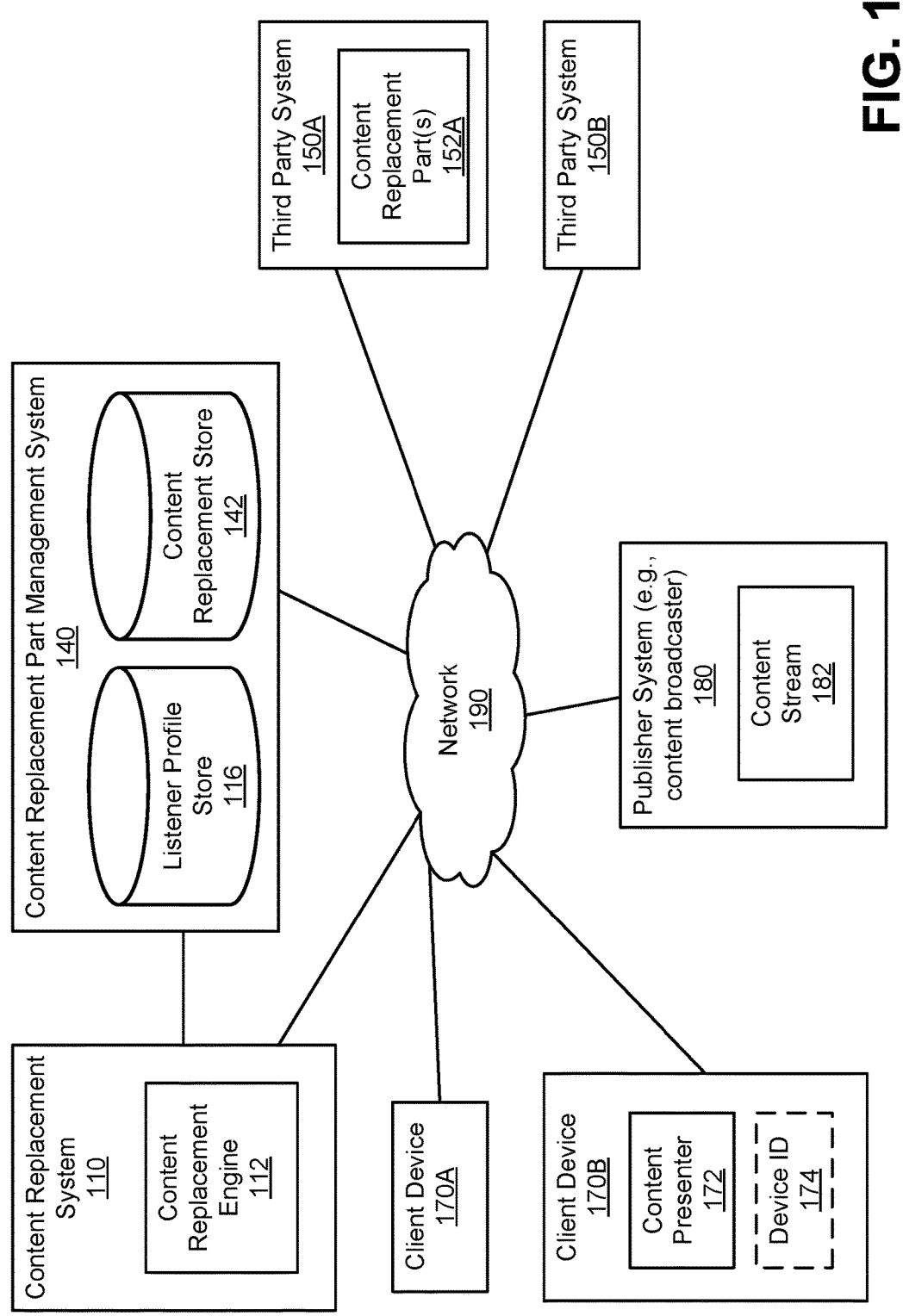
FIG. 1 illustrates an example environment for determining the identity of a user in a stateless device for audio stream customization, according to an embodiment

Example System for Determining Identity of a Listener in Stateless Devices for Content Stream Customization Figure (FIG.) 1 illustrates an example environment 100 for determining the identity of a user in a stateless device for audio stream customization, according to an embodiment. The environment 100 includes the network 190, one or more client devices 170 (e.g., client devices 170A-B as illustrated), a content replacement system 110, a content replacement part management system 140, a publisher system 180, and one or more third party systems 150 (e.g., third party systems 150A-B as illustrated). Although the illustrated environment 100 may include the elements shown in FIG. 1, in other embodiments the environment 100 may include different elements. Furthermore, the functionalities of each element may be distributed differently among the elements in other embodiments.

Example Network

The network 190, which can be wired, wireless, or a combination thereof, enables communications among the client devices 170, the content replacement system 110, the content replacement part management system 140, the third party system 150, and the publisher system 180, and may include the Internet, a local area network (LAN), virtual LAN (VLAN) (e.g., with VPN), wide area network (WAN), or other network. In one example embodiment, the network 190 uses standard communications technologies and/or protocols, such as Hypertext transfer Protocol (HTTP), Transmission Control Protocol/Internet Protocol (TCP/IP), Uniform Resource Locators (URLs), and the Doman Name System (DNS). In another example embodiment, the entities can use custom and/or dedicated data communications technologies instead of, or in addition to, the ones described above.

Example Client Device

The client devices 170 are electronic devices used by users to perform functions such as consuming digital content, executing software applications, browsing websites hosted by web servers on the network 190, downloading files, and interacting with the content replacement system 110. For example, the client devices 170 may be dedicated e-readers, smartphones, wearables (e.g., smartwatches or pendants), or tablets, laptops, or desktop computers configured similar to an exemplary machine (or computing system) described with FIG. 5. A client device 170 may include one or more applications, such as a web browser, to interact with services provided by the content replacement system 110. Although two client devices 170 are illustrated in FIG. 1, in other embodiments the environment 100 includes more client devices 170.

In one embodiment, a client device 170 includes a content presenter 172. This may be a software application executing on the client device 170, may be hardware component of the client device 170, or a combination thereof. The content presenter 172 may submit requests to the content replacement system 110 for content items, such as a content stream. The content presenter 172 may also request a selection of content streams (e.g., via a search) from the content replacement system 110. The content presenter 172 may select one of the content streams in the selection of content streams. In response to these requests, the content replacement system 110 provides the content presenter 172 with a content stream, which may be an audio stream. The content presenter 172 presents the recieved content stream to a listener of the client device 170.

For example, the client device 170 may be an entertainment system in a vehicle, and the content presenter 172 may be an integrated component in the entertainment system that may request a content stream via a wireless connection from the content replacement system 110 for presentation to a passenger or driver of the vehicle.

In one embodiment, the client device 170 includes a device ID 174. The device ID 174 uniquely identifies the device. It may be a serial number, manufacturer identifier, model number, network identifier (e.g., a media access control (MAC) address), private key of a private-public key pair, or other identifying element. The device ID 174 may also be settable by a user. Although some client devices 170 may include a device ID 174, other client devices 170 may not include device IDs. For example, many client devices 170 that may be used to listen to an audio content stream may be simple and/or special purpose built devices that have limited processing capabilities and/or storage capabilities. These devices may not be capable of storing any device IDs due to their limited capabilities. Furthermore, these devices may not be capable of storing any state information at all, and thus may not be able to identify themselves by any unique identifier (e.g., a device ID).

Example Publisher System

The publisher system 180 may be configured to transmit content streams, such as content stream 182, to destination systems, such as the content replacement system 110. The content stream that is transmitted by the publisher system 180 may be created at the publisher system 180, and may be an audio stream. The content stream 182 may also be transmitted to the content replacement system 110 substantially at the same time as it is created. The content stream 182 may be in any format capable of being streamed in real-time or non-real-time, such as MP3. The content stream 182 may be transmitted to the content replacement system 110 along with metadata, such as a description of the content within the content stream 182, program or content guide, technical specifications (e.g., format, bit rate), content author, and so on. In one embodiment, instead of being a separate system, the publisher system 180 is part of the same system as the content replacement system 110.

In addition, the content stream 182 may include one or more indicators that specify a content replacement break in the content stream 182 suitable for content replacement. Each content replacement break is a section of the content stream 182 that may be specified by a start point indicator and an end point indicator. These indicators are transmitted along with the content stream 182, either within the metadata of the content stream 182 or within the content stream 182 itself.

In the case where the indicators are transmitted in the metadata, the publisher system 180 may insert a specific, digital marker (a.k.a. digital flag) in the digitally encoded frame of the content stream 182 to represent a start and an end of the content replacement break section. The digital marker is chosen as an indicator that is supported by the chosen digital encoding format of the content stream 182 but which, when used, does not alter the playback sound (i.e., allows the playback sound to remain unchanged) and does not corrupt the format of the protocol (i.e., alter the content stream to be unplayable according to the standard or unsupported by existing playback devices). In one embodiment, the content stream 182 uses an MPEG (Moving Pictures Experts Group) format, and the publisher 180 modifies the private bit and/or the copyright bit of the MPEG frame for the start and end of the content replacement break to include the digital marker, without altering the encoded sounded or the expected behavior of the MPEG format for the content stream 182.

In the case where the indicators are transmitted in the content stream 182 itself, the publisher system 180 may mark the start and end of the content replacement break sections in the content stream 182 with a preset audible sound indicator (e.g., a "jingle"), which can span up to several seconds. In one embodiment, different audible sounds can be used to represent the beginning and the end of the content replacement break.

In one embodiment, instead of inserting an audible sound as an indicator, the publisher system 180 inserts a preset inaudible sound (also known as a beep) at a predetermined frequency (e.g., between 10 and 30 Hz (hertz)), with an amplitude in a specified band or over a specified threshold (as measured in decibels) for a duration exceeding a reference interval (e.g., between 50 ms and 500 ms). The frequency is at a range that may be beyond the normal human hearing ranges. The publisher system 180 embeds the inaudible sound in the content stream 182 sent to the content replacement system 110 as an indicator of the beginning and the end of the content replacement break. In one embodiment, several such inaudible sounds are used, on different frequencies, to represent the start and the end of the content replacement break.

In one embodiment, more than two sounds (with different frequencies) may be used to represent events other than the start and end of a content replacement break, such as an indication that an upcoming content segment should be synchronized amongst listeners.

There may be a trade-off between how accurately the audio identifier marks the start and stop of the content replacement break, and the reference interval used. Therefore, a short reference interval (e.g., 50 ms) increases the time accuracy, but may also cause a higher chance of false positive detections. Conversely, a longer interval (e.g., 500 ms) may correspond to a less favorable time accuracy, but a lower chance of false positive detection. The publisher system 180 may set the interval of the inaudible audio indicator such that the false positive detection rate is measured to be below a certain percentage.

In one embodiment, the publisher system 180 uses a combination of the above described methods in order to indicate the start and end of content replacement breaks.

Example Third Party System

The third party system(s) 150 may include electronic devices, systems, or other entities connected via network 190 and providing content replacement part(s) 152, such as content replacement parts 152A. These content replacement parts 152 are content items (e.g., an audio clip) that may be used to replace certain portions of the content streams 182 provided by the publisher systems 180. The third party systems 150 may transmit the content replacement parts 152 directly (i.e., in real-time) to the content replacement part management system 140 as the content replacement parts 152 are requested for presentation to listeners of client devices 170 through the content replacement system 110, as described in further detail below. Alternatively, the third party systems 150 may transmit the content replacement parts 152 a priori to the content replacement part management system 140 for storage and rapid retrieval. The third party system 150, when transmitting the content replacement part 152, may also provide any metadata associated with the content replacement part 152, such as criteria indicating the listeners for which to present the content replacement part 152. The criteria for each content replacement part 152 may include specific geographic criteria (e.g., location, language), demographic criteria (e.g., age range, gender), content streams in which the content replacement part should be inserted (e.g., content streams with certain genre characteristics), device criteria (e.g., mobile device only), and/or listener profile criteria (e.g., listeners with certain listening characteristics stored in a profile for the listener).

In one embodiment, a third party system 150 also transmits a baseline content score for each content replacement item to the content replacement part management system 140. The scale of the content score may be scaled according to a previously agreed upon standard by the various systems in the environment 100. A higher score indicates that a third party system 150 has determined that the associated content replacement part should receive a high priority in a ranking with other content replacement items with lower scores. The ranking may be used to determine which content replacement item to present to a listener (e.g., the highest ranked one). In one embodiment, the content score of a content replacement part determines an amount of compensation or benefit that the third party system 150 associated with the content replacement part should provide to the content replacement system 110 for presenting the selected content replacement part to the listener.

Example Content Replacement Part Management System

The content replacement part management system 140 is configured to respond to requests for content replacement parts with content replacement parts. The content replacement part management system 140 includes a replacement content store 142 and a listener profile store 116.

The content replacement store 142 stores content replacement parts. These content replacement parts include content items, such as the content replacement parts 152 from the third party systems 150, which may be inserted into a content stream for presentation to listeners of the client devices 170. The content replacement store 142 may store with each content replacement part various metadata regarding that content replacement part. The metadata may include information provided by the third party systems 150 for each content replacement item. In one embodiment, the content replacement part management system 140 may receive a request from the content replacement system 110 for one or more content replacement parts, along with information regarding a content stream being presented the listener of a client device, and any available identifying characteristics of the listener and/or the client device. In response, the content replacement part management system 140 may transmit as a reply the one or more content replacement parts with criteria that indicate the characteristics of the content stream, listener, and/or client device. In another embodiment, instead of receiving the various characteristics regarding the listener profile of the listener, the content replacement part management system 140 receives an identifier of the listener, and looks up the listener profile of the listener in the listener profile store 116 using the identifier, as described in further detail below.

In one embodiment, the content replacement part management system 140 retrieves the content replacement parts directly from the content providers of the content replacement parts (e.g., the third party systems 150) when receiving a request for content replacement parts. To do this, the content replacement part management system 140 may transmit the characteristics of the listener, content stream, client device, and/or other information (which may be stripped of personally identifiable information) to the content providers, which may respond with content replacement parts and any associated metadata.

In one embodiment, the content replacement part management system 140, when receiving a request for content replacement parts, also receives an indication of an estimate of the duration of the content replacement breaks into which the content replacement parts are to be inserted. In such a case, the content replacement part management system 140 responds with content replacement parts that are no longer in duration than the duration of the content replacement break. This duration may be an estimated duration or a maximum duration for content replacement breaks for the content stream being presented to a listener.

In some cases, the content replacement part management system 140 may constrain the content replacement parts that are selected based on various constraints. For example, one constraint may indicate that two content replacement parts may be from two competing content sources (e.g., two competitors making the same product) should not both be inserted into the same content replacement break. These constraints may be specified by the third party systems 150 for associated content replacement parts. Additionally, the content replacement parts may all have similar durations within a threshold range (e.g., all 25-35 seconds).

The listener profile store 116 is a database that stores collected information regarding listeners and client devices. For each request from a client device 170, a new entry may be entered into the listener profile store storing information related to the request. The information entered into the new entry may be received from the content replacement system 110. The new entry may include information such as the source network address (e.g., Internet Protocol (IP) address) from which the request was received from, a timestamp, any device ID (e.g., device ID 174) provided by the client device 170, a user agent string, if provided. The listener profile store 116 may also store for each request the content replacement parts which were presented to the listener. In one embodiment, the content replacement part management system 140 is able to respond to a request for data from the listener profile store 116 within a very short period of time (e.g., 10 ms).

The listener profile store 116 may further group the collected information according to various keys, such as by network address, device ID, and so on. For each key, the listener profile store 116 may also store information regarding how many times requests have been made that have information matching the key. For example, all requests from a single IP address may be grouped in a single entry, and that entry may also indicate how many requests have been made from that IP address.

Example Content Replacement System

The content replacement system 110 may include an electronic device or collection of electronic devices that dynamically replaces content in content streams with replacement content received from the content replacement part management system 140. The content replacement system 110 may include a content replacement engine 112.

The content replacement engine 112 replaces content in content streams to present customized content streams to listeners. The content replacement engine 112 may receive one or more content streams 182 from one or more publisher systems 180. These content streams, as described above, may be audio streams, or may be other forms of content (e.g., video, interactive, text and graphics based), may be in one of many streaming formats, and may be associated with various metadata.

The content stream 182 includes content replacement breaks, which are indicated by start and end indicators. The section of content of a content stream 182 in-between the start and end indicators is a section which the publisher of the content stream 182 has deemed to be replaceable by replacement content, such as the content replacement parts from a third party system, such as third party system 150. This provides an opportunity to customize the content stream for every listener of the content stream, and thus every listener receives a customized content stream based off the content stream but including the replacement content parts.

The content replacement engine 112 may determine the start and end indicators for the content stream 182 using different methods depending on the type of start and end indicators within the content stream 182. In one embodiment, the content replacement engine 112 detects the start and end indicators, which may be audio signals as described above, using machine learning, Fourier Transforms, Fast Fourier Transforms, and/or Goertzel in the content stream 182 as it is from the publisher.

In one embodiment, when the indicators are digital markers (flags) included in the metadata of the content stream 182 as described above, the content replacement engine 112 detects the indicators by reading the digital data of the content stream metadata (as opposed to using a spectrum analysis method). After detecting such digital markers (flags) the content replacement system 112 may change them to their inactive state before retransmitting the content stream to the listener.

When receiving the content stream 182, the content replacement engine 112 may detect a start indicator (e.g., using one of the methods described above), which indicates the start of a content replacement break. Upon detecting the start of the content replacement break, the content replacement engine 112 may request one or more content replacement parts from the content replacement part management system 140. To request these content replacement parts from the content replacement part management system 140, the content replacement engine 112 may submit information about the listener, such as listener demographics, content consumption history, and information about the current content stream 182, such as its genre, name, etc. Alternatively, the content replacement engine 112 requests the content replacement parts prior to identifying the start indicator.

As described above, in response to the request by the content replacement engine 112 for content replacement parts, the content replacement engine 112 receives as a response from the content replacement part management system 140 the one or more content replacement parts. These content replacement parts are content items submitted by entities such as the third party systems 150 for insertion into the content replacement break to generate a customized content stream for presentation to a listener at a client device 170.

Additional details regarding the insertion of content replacement parts is described in U.S. patent application Ser. No. 15/204,986 filed on Jul. 7, 2016, which is hereby incorporated by reference in its entirety.

The content replacement engine 112 also queries the listener profile store 116 of the content replacement part management system 140 for information about the client device 170 and listener. In particular, using the information from the listener profile store 116, the content replacement engine 112 determines whether the client device 170 has been encountered before and whether content replacement parts have been presented in a content stream to the listener of the client device 170.

When querying the listener profile store 116, the content replacement engine 112 provides an identifier for the client device 170 in the request. The content replacement engine 112 may provide as an identifier the network address of the client device 170, and may provide a device ID, user agent, model number, and/or other information that is provided by the client device 170 in the initial request for the content stream 182. However, not all client devices 170 will provide the identifying information described here, and some client devices 170 may only be associated with a network address and provide no other identifying information. The network address may be determined by the content replacement engine 112 using the network protocol (e.g., the network address may be the source network address specified in a packet received by the content replacement engine 112), and may not be explicitly provided by the client device 170.

Once the content replacement engine 112 receives the information (e.g., historical data) for the client device 170 from the listener profile store 116, the content replacement engine 112 determines a retargeting probability for each received content replacement part. This retargeting probability indicates the likelihood that the same content replacement part was previously presented to the listener of the client device 170. The retargeting probability is:

$$P(\Delta t, IP) = e^{-\alpha \Delta t} \frac{|DeviceID|}{|IP.DeviceID|} \quad (1)$$

As shown in equation (1), $\Delta t$ is the time elapsed (e.g., in hours, rounded down) from the prior presentation of the same content replacement part to the current client device 170 or to a client device with the same network address as the current client device 170. This may be determined by the content replacement engine 112 using the difference between the timestamp of the previous entry in the listener profile store 116 for the same content replacement part and the current timestamp. |IP.DeviceID| represents the number of device IDs that have been identified in all requests for content replacement part(s) from the network address (e.g., IP address) of the current client device 170 in a recent window of time (e.g., 24 hours, 7 days). |DeviceID| represents the number of times the most frequently encountered device ID from the same network address within the same recent window of time has been encountered in requests for any content replacement part(s). Alternatively, |DeviceID| may represents the number of times the most frequently encountered device ID has been encountered in requests for the same content replacement part(s) from the network address within the same recent window of time. $\alpha$ represents a decay parameter indicating how quickly the probability value should decrease over time. This value may be defined by the third party system associated with the content replacement part to be presented or by the content replacement system 110. For example, it may be set to 0.1. Note that in some cases, the current request may also be counted when computing the values above.

As an example of computing the retargeting probability, the content replacement engine 112 has previously presented a content stream and a content replacement part to a listener A with IP address A using device with device ID A (device A) on Monday at 7 pm. Subsequently, on Tuesday at 8 am (13 hours later), the content replacement engine 112 receives a request for a content stream from the same listener A with IP address A but using a device with device ID B (device B). Furthermore, in the past 24 hours, 20 requests for content replacement parts have been made for presentation to devices having IP address A, with 5 of these specifically for device A, and 3 from device B. In this case, the retargeting probability computed for the 8 am request from device B is (assuming a decay value of 0.1):

$$P(\Delta t, IP) = \quad (2)$$
$$e^{-0.1(13)} \frac{[\text{device } A \text{ count}]}{[\text{device } B \text{ count for } IP \text{ addr } A]} = e^{-0.1(13)} \frac{5}{3} \approx 0.45$$

Note that although the retargeting probability includes a part "$e^{-\alpha \Delta t}$," in another embodiment, the part "$e^{-\alpha \Delta t}$" may be replaced by any other monotonously decreasing function upper-bounded by 1.0 and lower bounded by 0.0.

The content replacement engine 112 determines the retargeting probabilities for each content replacement part that it receives. Once the content replacement engine 112 determines the retargeting probability for each content replacement part, the content replacement engine 112 may normalize the retargeting probability values computed for each content replacement part. The content replacement engine 112 modifies the baseline content score associated with each content replacement part with its associated retargeting probability.

In one embodiment, the modified content score for a content replacement part is increased from the baseline content score for the content replacement part in proportion to the retargeting probability value. Thus, a replacement content part is scored higher when the content replacement engine 112 has determined that a listener is more likely to have been presented with the content replacement part previously. As the listener has previously encountered the same content replacement part, by presenting the same content replacement part (or a similar version of the same content replacement part) to the listener again, this may increase the retention of the content within the content replacement part by the listener. Thus, the content replacement part is given a higher content score in such a case.

For example, the score may be modified according to the following equation:

[modified content score]=[baseline content score]*
[max percent]* $P(\Delta t, IP)$ (3)

The baseline content score is the one provided with each content replacement part. The max percent is a maximum percentage value for the modified content score specified by the third party system 130 associated with the content replacement part. In one embodiment, the max percent may change depending upon the value of the retargeting probability. For example, if the retargeting probability exceeds 20%, the max percent may be increased (e.g., to 100%).

Once the content replacement engine 112 computes the modified content scores for each content replacement part, the content replacement engine 112 ranks the content replacement parts according to their modified content scores. The content replacement engine 112 may select a number of those content replacement parts with the highest modified content scores for presentation in the content stream to the listener. Alternatively, the content replacement engine 112 may insert the content replacement parts into the content stream in order according to their modified content scores from highest to lowest.

When inserting the content replacement parts into the content stream 182 for the listener, the content replacement engine 112 inserts into the content stream each content replacement part after the end of the previous content replacement part. Thus, the content replacement parts are inserted consecutively from the start indicator of the content replacement break. The content replacement engine 112 may insert the replacement parts into the existing content stream by merging the replacement part into the content stream. For example, the content replacement engine 112 may insert the waveform of the replacement part into the waveform of the content stream at the correct location and re-encode the merged waveform as the content stream for the listener. If the content stream is live, these content replacement parts are streamed by the content replacement system 110 to the listener as they are inserted.

The content replacement engine 112 inserts the content replacement parts until it detects the end indicator of the content replacement break in the content stream 182. In one embodiment, the content replacement engine 112 also inserts a content replacement part of a selected duration that most closely approximates the remaining duration between the end of the finally inserted content replacement part and the end of the content replacement break.

After inserting each content replacement part, the content replacement engine 112 may transmit information regarding the listener, client device 170, and content replacement part to the content replacement part management system 140 for storing of the information in the listener profile store 116. In addition to transmitting the network address of the client device 170, the information that is transmitted by the content replacement engine 112 for storage in the listener profile store 116 may include, but is not limited to: 1) device type, which may be provided by the client device 170, e.g., via a serial number; 2) device manufacturer, which may also be provided by the client device 170; 3) a timestamp at which the content replacement part was requested (the timestamp may have varying granularity, e.g., hour only, or part of day); and/or 4) the content stream 182 or genre that was requested by the client deice 170/network address. The content replacement engine 112 may also store, after the client device 170 terminates the streaming of a selected content stream 182, the duration for which the content stream 182 was streamed. This may be used to determine an average duration of each streaming session.

In one embodiment, this additional information is also used to compute a modified retargeting probability. The content replacement engine 112 selects information within the information sent to the listener profile store 116 that is unique, or that which does not change over time with regards to the lifecycle of a client device 170. For example, this might include the type and make of the client device 170, the consumption patterns of the listener of the client device 170 (i.e., the patterns of content that have been presented to the listener), the most frequent type of content requested by the listener, and so on.

As another example, the time portion of day may be considered for the modified retargeting probability. Specifically, the time of day may be split into N portions (with N>0), and this value may be represented as a day part, or DP. The modified retargeting probability in this case would be:

$$P(\Delta t, IP) = e^{-\alpha \Delta t} \frac{|DeviceID|}{|IP.DP.DeviceID|} \quad (4)$$

Here, the variables are the same as in equation (1), however, |IP.DeviceID| is now |IP.DP.DeviceID|. |IP.DP.DeviceID| represents the number of requests for content replacement parts from different device IDs from the same network address (e.g., IP address) within a specific day part (e.g., morning 5-11 am) in the same recent window of time (e.g., 24 hours) used for computing the |DeviceID| (and as described above). The specific day part (i.e., time portion of the day) may correspond to the current day part in which the current request for content replacement parts is being made. For example, the current time may be within the morning day part of 5-11 am. In the past 24 hours, seven different device IDs may have been associated with requests for content replacement parts from a single network address, but only four of them were within the specified day part (DP) of the morning period from 5-11 am. Thus, |IP.DP.DeviceID| is set to 4. Note that some requests may have included the same device ID, but these are not counted separately as only unique device IDs are counted.

The content replacement engine 112 may repeat the insertion of the content replacement parts as described above for as long as the listener consumes the content stream.

In some cases, the client device 170 making the request for the content stream 182 is not capable of storing or transmitting a device ID 174 and/or other information other than a network address. In such a case, the content replacement engine 112 may assign the client device 170 a default device ID. The default device ID may correspond to the device ID 174 encountered most frequently in a past window of time (e.g., 24 hours) for the network address of the client device 170, or if no device IDs have ever been encountered for the network address for the client device 170, the default device ID may be a randomly generated unique device ID.

Although the above description is made with reference to listeners and audio streams it is not limited to such and may be applied to other content, such as video and interactive content.

In one embodiment, the method according to the invention may be part of a larger media servicing network that can be used to, among other things, deliver streaming (real-time) and/or static (on-demand) content, deliver targeted advertising, collect metric information regarding content and advertising consumption.

Additional details regarding the method described above are described in further detail with regards to FIGS. 2-5.

Using the system described above, multiple advantages may be realized. The system is able to compute a retargeting probability even for requests from client devices 170 that are not only incapable of storing state information (e.g., cookies, user login information, etc.) but which may not be capable of transmitting any sort of identifying information, such as a device ID. A device capable of playing a content stream such as an audio stream may be designed inexpensively and each device may not be configured individually to store a different device ID, nor may it be configured with sufficient storage (e.g., memory) for storing state information. Nevertheless, such devices may be popularly used by listeners due to their lower price due to the lower cost of manufacture. Thus, a system that may compute the likelihood that the same listener is requesting a content stream from such a limited device is advantageous.

Furthermore, by being able to determine a retargeting probability for a listener, the system is able to better target repeat listeners, which allows the system to further emphasize certain content to these listeners. If these content items include messages, for example, to persuade a listener to perform a certain action (e.g., a purchase), by showing the same content to a listener more than once, the message may be further reinforced.

Example Flow for Computation of Retargeting Probability for Content Delivery

Figure 2:
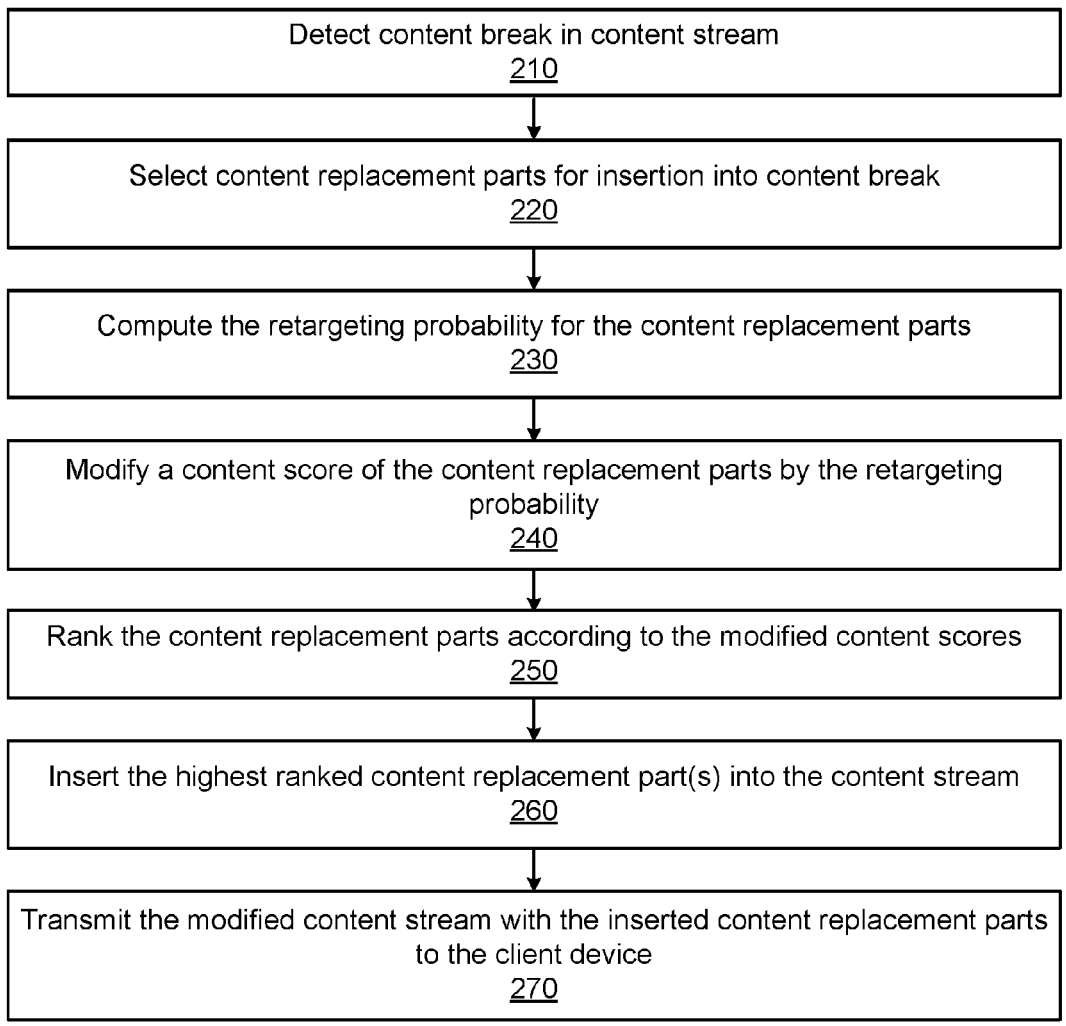
FIG. 2 is a flow chart illustrating an exemplary method for the computation of retargeting probability for content delivery, according to one embodiment.

FIG. 2 is a flow chart illustrating an exemplary method 200 for the computation of retargeting probability for content delivery, according to one embodiment. In one embodiment, FIG. 2 attributes the steps of the method 200 to the content replacement system 110. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 524, that may be executed by the processor 502 described with respect to FIG. 5.

The content replacement system 110 detects 210 a content break in a content stream. After detecting the content break, the content replacement system 110 selects one or more content replacement parts for insertion into the content break. As described above, the content replacement system 110 may request the content replacement parts from the content replacement part management system 140.

The content replacement system 110 computes 230 the retargeting probability for the content replacement parts. As described above, the retargeting probability may depend upon the number of times requests for content replacement parts have been made in association with a content stream from a client device associated with a specific network address and device ID. A higher retargeting probability for a content replacement part indicates a higher likelihood that the listener for which the content replacement part may be currently presented to is the same as the listener that was previously presented with the same content replacement part.

The content replacement system 110 modifies 240 the baseline content score of each content replacement part with the retargeting probability to generate a modified content score. The content replacement system 110 ranks 250 the content replacement parts according to their respective modified content scores.

The content replacement system 110 inserts 260 a number of the highest ranked content replacement parts (or the single highest ranked content replacement part) in to the content stream for the client device of the listener, and transmits 270 the modified content stream with the inserted content replacement parts to the client device. The content replacement system 110 may repeat this process for each content replacement break.

Figure 3:
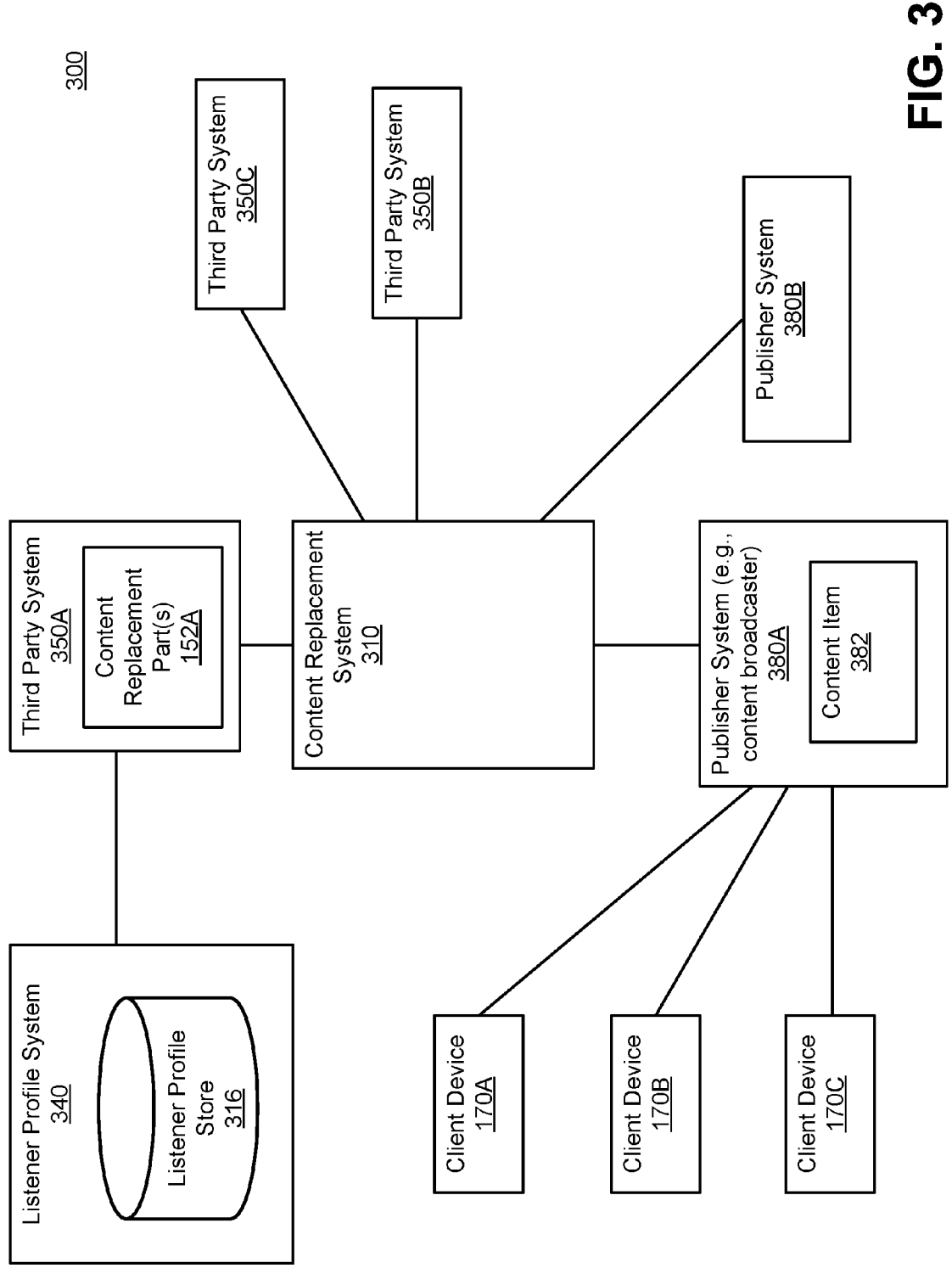
FIG. 3 illustrates an alternative example environment for determining the identity of a listener for stateless devices for content stream customization, according to an embodiment.

Example Alternative System for Determining Identity of Listener in Stateless Devices for Content Stream Customization FIG. 3 illustrates an alternative example environment 300 for determining the identity of a listener for stateless devices for content stream customization, according to an embodiment. The environment 300 includes one or more client devices 170, one or more third party systems 350, a content replacement system 310, a listener profile system 340, and a publisher system 380. Although the illustrated environment 300 may include the elements shown in FIG. 3, in other embodiments the environment 300 may include different elements. Furthermore, the functionalities of each element may be distributed differently among the elements in other embodiments.

Note that although a network is not explicitly illustrated in FIG. 3, the elements in FIG. 3 are communicatively coupled to each other according to the illustrated lines. The connections between the elements in FIG. 3 may be similar to those connections of the network 190 described above with reference to FIG. 1. The client devices 170 are similar to those described above with reference to FIG. 1, and thus their description will be omitted here.

Example Publisher System

The publisher system 380 is similar to the publisher system 180 described above with reference to FIG. 1, however instead of transmitting a content stream to the content replacement system 110 as described above, the publisher system 380 transmits a content item 182 directly to the client devices 170. The content item 382 may be any type of content, such as audio content, visual content, interactive content, and so on. The content item may be a content stream 182. Additionally, unlike the publisher system 180, the publisher system 380 may also request the content replacement parts from the content replacement system 310 instead of having the content replacement system 310 perform the insertion of the content replacement parts and transmit the modified content item to the client device 170. When requesting the content replacement part, the publisher system 380 may also transmit information regarding the user to which the content item 382 is being presented, the user's client device, and/or the content item 382 itself. This information may include a network address, device ID, timestamp, the genre/type of the content item 382, etc.

Example Listener Profile System

The listener profile system 340 includes a listener profile store 316 to store listener profile data. The listener profile store 316, instead of receiving the listener profile information from the content replacement system 110 as described above with reference to FIG. 1, instead receives listener profile information from the third party system 350 directly. Multiple third party systems 350 may use the same listener profile system 340 to store and retrieve a shared set of listener profile information, or alternatively each third party system 350 may have its own listener profile system 340. The information stored in the listener profile store 316 may be similar to the information stored in the listener profile store 116 described above, and may include network addresses, timestamps, device IDs, content items that have been presented, and so on.

Example Third Party System

Each of the third party system(s) 350 are also similar to the third party system(s) 150 described above with reference to FIG. 1. However, the third party system 350 may store the content replacement part(s) 152 associated with the third party system 350 locally instead of transmitting the content replacement part 152 to another system. The third party system 350 may still associate with each content replacement part 152 a baseline content score, along with the metadata as described above.

Additionally, instead of transmitting the content scores to another system, the third party system 350 may instead receive a request for a content replacement part from the content replacement system 310. Upon receiving the request, the third party system 350 determines if a response is required. The request may include information regarding the user consuming the content stream and/or content stream being presented as described above.

The third party system 350 may then determine whether the information provided by the content replacement system 310 matches the criteria of a content replacement part, and if so, may determine that a response should be provided. As described above, the criteria of a content replacement part may indicate the types of listeners to which the content replacement part should be presented.

To respond to the request, the third party system 350 computes a modified bid value locally and transmits the modified bid value and the associated content replacement part 152 to the content replacement system 310. The computation of the modified bid value, including the computation of the retargeting probability, may be similar to the computation of the retargeting probability described above with reference to FIG. 1 for the content replacement system 110.

After submitting the response, the third party system 350 may receive a message from the content replacement system 310 indicating whether the content replacement part that it transmitted to the content replacement system 310 was selected for presentation to a user. If the content replacement part was selected for presentation to the user, the third party system 350 may then transmit a message to the listener profile system 340 to update the listener profile store 316 with the information regarding the user, client device, and content replacement part that was presented, depending upon the information that is available. As described above, if the device ID for a client device is unavailable, the most frequently occurring device ID for the associated network address may be assigned to the client device.

Example Content Replacement System

The content replacement system 310 responds to requests for content replacement parts from publisher 380 with content replacement parts. Instead of computing retargeting probabilities and determining modified content scores as described above, the content replacement system 310 instead receives requests from publisher systems 380 for content replacement parts. In response, the content replacement system 110 requests content replacement parts from a list of third party systems 350. In each request, the content replacement system 310 includes the information regarding the listener, client device, and/or content item that is provided by the publisher system 380. As noted previously, this may include the network address of the client device, device ID of the client device, and so on.

The content replacement system 310 receives in response from the third party systems 350 various content replacement parts and content scores. The content replacement system 310 may rank the content replacement parts according to the content scores, and transmit the content replacement part with the highest score to the publisher system 380 in response to the request from the publisher. The content replacement system 310 may also transmit a message to the third party system 350 with the highest ranked content score. This content score may also be used to determine a value amount that the third party system 350 should provide to the content replacement system 310 as compensation, a portion of which may be transferred to the publisher system 380. In one embodiment, the content replacement system 310 acts as an exchange for content replacement parts between multiple third party systems 350 and multiple publisher systems 380.

Example Transaction Diagram for Content Replacement Part Selection

Figure 4:
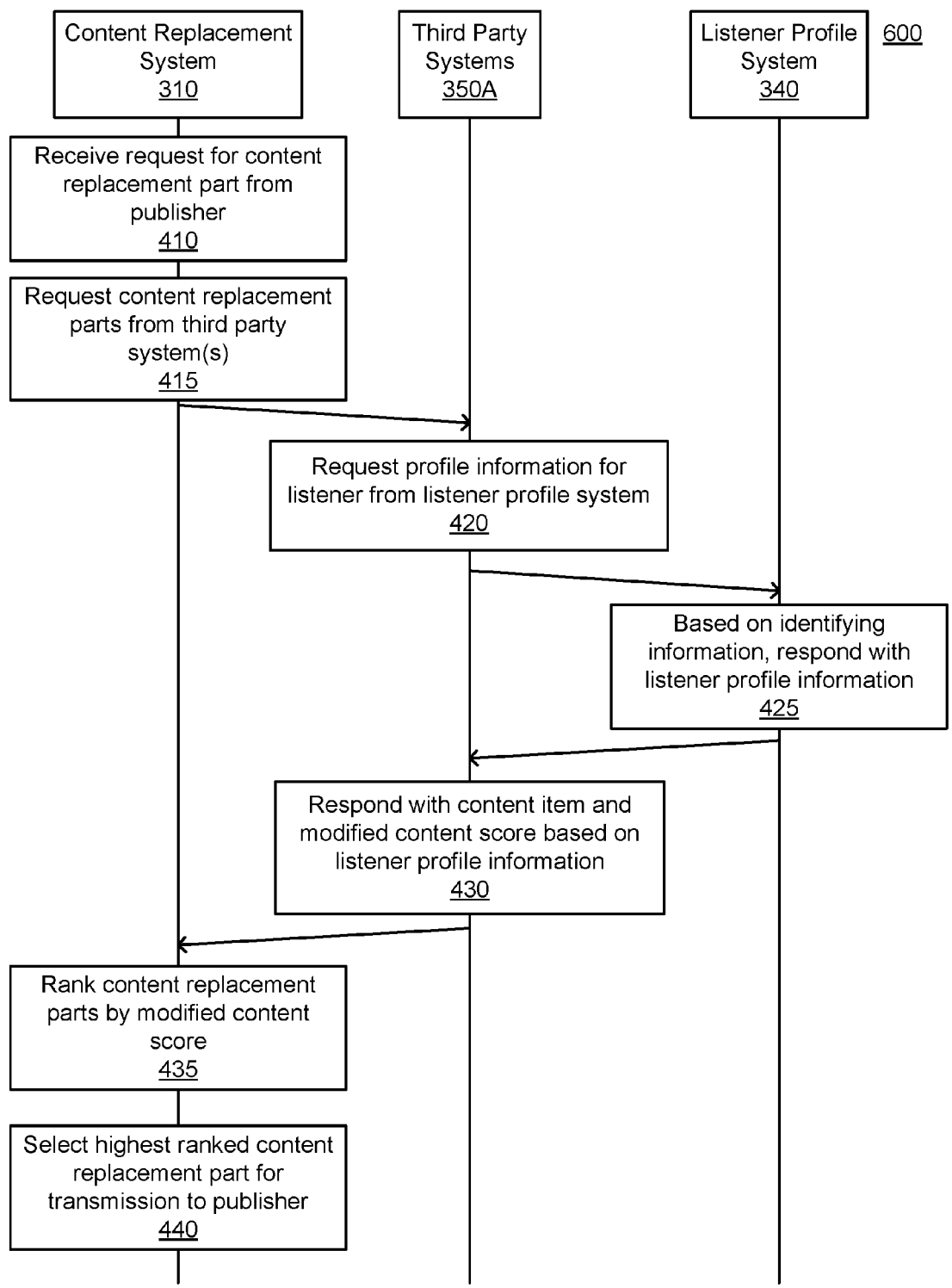
FIG. 4 is a transactional diagram illustrating the exchange of content replacement parts based on the retargeting probability, according to one embodiment.

FIG. 4 is a transactional diagram illustrating the exchange of content replacement parts based on the retargeting probability, according to one embodiment. The transactional diagram of FIG. 4 shows the content replacement system 310, the third party system 350, and the listener profile system 340, among the other systems of environment 300. Although certain elements are illustrated here to perform certain operations, in other embodiments some or all of the operations may be performed by other elements. In addition, some embodiments may perform the operations in parallel, perform the steps in different orders, or perform different steps. Also, it is noted that in one example embodiment the operations and/or modules may be embodied as instructions, e.g., instructions 524, that may be executed by one or more processors 502 described with respect to FIG. 5.

Initially, the content replacement system 310 receives 410 a request for a content replacement part from the publisher system 380. The content replacement part is to be inserted into a content item 182 by the publisher system 380 for presentation to a user.

The content replacement system 310 requests 415 content replacement parts from third party systems 350. This may be done by transmitting a message to the third party systems 350 with information about the client device, user, and content item as described above.

The third party system 350 requests 420 profile information for the user from the listener profile system 340. The request may identify the user based on a device ID, network address, or other uniquely identifying information, as described above. The listener profile system 340 responds 425 with listener profile information for the user and/or client device. As described above, this information may include the number of different device IDs received for requests for content replacement parts within a recent period of time for the indicated network address and timestamps for each request. The listener profile system 340 may also respond with other information, such as the content type of the content item in previous requests, and so on.

The third party system 350, after receiving the listener profile information, responds 430 with the content item and the modified content score for the content item that has been modified based on the listener profile information. In particular, the content score may be modified based on a retargeting probability computed based on the listener profile information, as described above.

The content replacement system 310 receives the content replacement parts and associated modified content scores from the third party systems 350 and ranks 435 the content replacement parts by their respective content scores. After ranking, the content replacement system 310 selects 440 the highest ranked content replacement part(s) to the publisher system 380. The publisher system 380 inserts these selected content replacement parts into the content item for presentation to the user.

Example Machine Architecture

Figure 5:
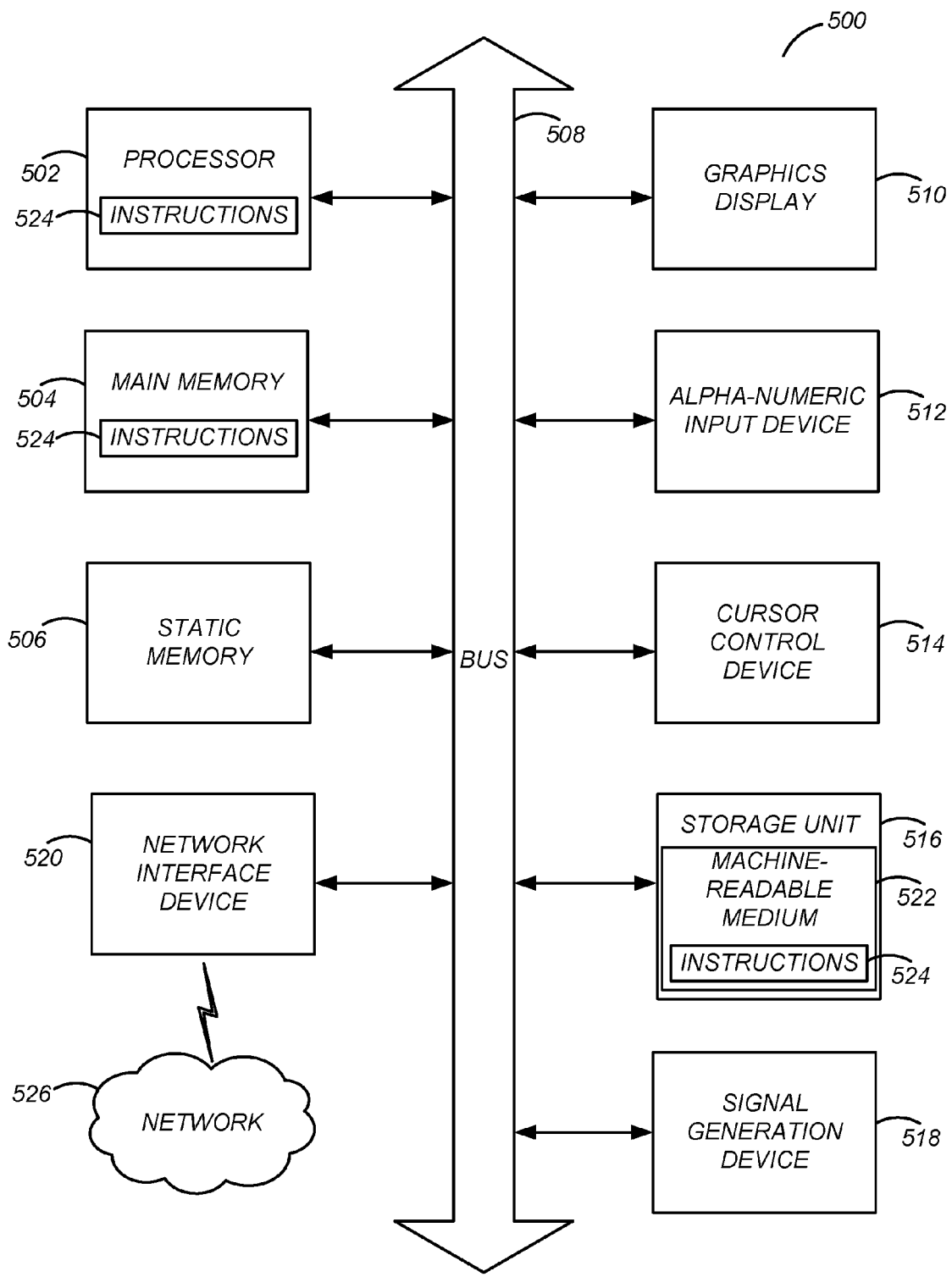
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 500 is used to execute the processes and functionality described in FIGS. 1-4. For example, the client device 170, the publisher system 180, the content replacement system 110, the content replacement part management system 140, and the third party system 150, the listener profile system 340, the third party system 350, the content replacement system 310, and the publisher system 380 may all be components of, or include the computer system 500. It is noted that the computer system 500 is exemplary and that not all the components described herein may be necessary to execute the processes as described above.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 506 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that include the ability to identify repeat listeners using stateless devices based on a retargeting probability. As many devices may not store states or other uniquely identifying information, being able to identify these devices uniquely allows the system advantageously determine whether a device has been encountered before, and customize content presented to a user of that device based on this information.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 502) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 524) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 502 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 504). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for determining a probability of whether a stateless client device has been previously encountered for the purposes of content stream customization. Thus, while particular embodiments and applications have been illustrated and described, it is to be understood that the disclosed embodiments are not limited to the precise construction and components disclosed herein.

Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   detecting a start of a content replacement break in a content stream provided to a client device by detecting an indicator in the content steam, wherein the indicator is a digital marker that is supported by a digital encoding format of the content stream;
   selecting one or more of a plurality of content replacement parts;
   computing a retargeting probability for each of the selected content replacement parts, the retargeting probability based on collected information stored in a profile database, the collected information including a number of times that requests for content replacement parts have been associated with a network address and device identifier of the client device;
   modifying a content score of each of the selected content replacement parts by at least scaling the content score of each of the selected content replacement parts with the corresponding retargeting probability computed for the selected content replacement part;
   ranking the selected content replacement parts based on the modified content scores;
   inserting one or more of the highest ranked selected content replacement parts into the content stream; and
   transmitting the content stream with inserted content replacement parts to the client device.

2. The computer-implemented method of claim 1, wherein the content stream is an audio stream.

3. The computer-implemented method of claim 1, wherein
   the digital marker in the content stream does not alter the playback of the content stream and does not alter the content stream to be unplayable according to the digital encoding format.

4. The computer-implemented method of claim 1, further comprising:
   receiving the plurality of content replacement parts from one or more third party systems, each of the plurality of content replacement parts associated with metadata, the metadata indicating a content score for each content replacement part, the metadata also including criteria indicating listeners for which to present the content replacement part.

5. The computer-implemented method of claim 1, further comprising:
   storing in the profile database a new entry including at least the network address of the client device, a timestamp, and any available device identifier received from the client device, the device identifier being a unique identifier for the client device.

6. The computer-implemented method of claim 5, further comprising:
   in response to not receiving a device identifier from the client device, storing in the new entry a device identifier corresponding to the most frequently encountered device identifier for the network address of the client device.

7. The computer-implemented method of claim 1, wherein retargeting probability for each one of the selected content replacement parts is computed by:

accessing the profile database to determine a device ID count, the device ID count being a number of times that content replacement parts have been requested in association with the most common device identifier from the network address of the client device within a specified recent window of time;

accessing the profile database to determine a network address device ID count, the network address device ID count being a number of times that content replacement parts have been requested in association with the device identifier of the client device within a specified recent window of time and from the network address of the client device requesting the current content stream;

computing a device ID ratio, the device ID ration being the device ID count divided by the network address device ID count; and computing as the retargeting probability the device ID ratio modified by a decay function according to the time elapsed from the most recent prior request for content replacement parts associated with the network address of the current client device.

8. The computer-implemented method of claim 7, wherein the decay function is a function of the base of the natural logarithm with an exponent comprising a decay factor and the time elapsed.

9. The computer-implemented method of claim 1, wherein the content score of each content replacement part is further modified by:
computing a product of the scaled content score by a maximum percentage value, the maximum percentage value specified by the third party system associated with the selected content replacement part.

10. The computer-implemented method of claim 1, wherein retargeting probability for each one of the selected content replacement parts is computed by:
accessing the profile database to determine a device ID count, the device ID count being a number of times that content replacement parts have been requested in association with the most common device identifier from the network address of the client device within a specified recent window of time;

accessing the profile database to determine a network address day part device ID count, the network address day part device ID count being a number of times that content replacement parts have been requested in association with the device identifier of the client device within a specified recent window of time, within a specific time portion of a day, and from the network address of the client device requesting the current content stream;

computing a device ID ratio, the device ID ration being the device ID count divided by the network address day part device ID count; and computing as the retargeting probability the device ID ratio modified by a decay function according to the time elapsed from the most recent prior request for content replacement parts associated with the network address of the current client device.

11. A non-transitory computer storage readable medium comprising stored instructions, the instructions that when executed by a processor cause the processor to:
detect a start of a content replacement break in a content stream provided to a client device by detection of an indicator in the content steam, wherein the indicator is a digital marker that is supported by a digital encoding format of the content stream;

select one or more of a plurality of content replacement parts;

compute a retargeting probability for each of the selected content replacement parts, the retargeting probability based on collected information stored in a profile database, the collected information including a number of times that requests for content replacement parts have been associated with a network address and device identifier of the client device;

modify a content score of each of the selected content replacement parts by at least scaling of the content score of each of the selected content replacement parts with the corresponding retargeting probability computed for the selected content replacement part;

rank the selected content replacement parts based on the modified content scores;

insert one or more of the highest ranked selected content replacement parts into the content stream; and transmit the content stream with inserted content replacement parts to the client device.

12. The non-transitory computer storage readable medium of claim 11, wherein the content stream is an audio stream.

13. The non-transitory computer storage readable medium of claim 11, wherein the digital marker in the content stream does not alter the playback of the content stream and does not alter the content stream to be unplayable according to the digital encoding format.

14. The non-transitory computer storage readable medium of claim 11, comprising further stored instructions that when executed by the processor cause the processor to:
receive the plurality of content replacement parts from one or more third party systems, each of the plurality of content replacement parts associated with metadata, the metadata indicating a content score for each content replacement part, the metadata also including criteria indicating listeners for which to present the content replacement part.

15. The non-transitory computer storage readable medium of claim 11, comprising further stored instructions that when executed by the processor cause the processor to:
store in the profile database a new entry including at least the network address of the client device, a timestamp, and any available device identifier received from the client device, the device identifier being a unique identifier for the client device.

16. The non-transitory computer storage readable medium of claim 15, comprising further stored instructions that when executed by the processor cause the processor to:
in response to not receiving a device identifier from the client device, store in the new entry a device identifier corresponding to the most frequently encountered device identifier for the network address of the client device.

17. The non-transitory computer storage readable medium of claim 11, comprising further stored instructions for the computation of the retargeting probability for each one of the selected content replacement parts, that when executed by the processor cause the processor to:
access the profile database to determine a device ID count, the device ID count being a number of times that content replacement parts have been requested in association with the most common device identifier from the network address of the client device within a specified recent window of time;

access the profile database to determine a network address device ID count, the network address device ID count being a number of times that content replacement parts have been requested in association with the device identifier of the client device within a specified recent window of time and from the network address of the client device requesting the current content stream;

compute a device ID ratio, the device ID ration being the device ID count divided by the network address device ID count; and compute as the retargeting probability the device ID ratio modified by a decay function according to the time elapsed from the most recent prior request for content replacement parts associated with the network address of the current client device.

18. The non-transitory computer storage readable medium of claim 17, wherein the decay function is a function of the base of the natural logarithm with an exponent comprising a decay factor and the time elapsed.

19. The non-transitory computer storage readable medium of claim 11, comprising further stored instructions for the modification of the content score of each content replacement part, that when executed by the processor cause the processor to:

compute a product of the scaled content score by a maximum percentage value, the maximum percentage value specified by the third party system associated with the selected content replacement part.

20. The non-transitory computer storage readable medium of claim 1, comprising further stored instructions for the computation of the retargeting probability for each one of the selected content replacement parts, that when executed by the processor cause the processor to:

access the profile database to determine a device ID count, the device ID count being a number of times that content replacement parts have been requested in association with the most common device identifier from the network address of the client device within a specified recent window of time;

access the profile database to determine a network address day part device ID count, the network address day part device ID count being a number of times that content replacement parts have been requested in association with the device identifier of the client device within a specified recent window of time, within a specific time portion of a day, and from the network address of the client device requesting the current content stream;

compute a device ID ratio, the device ID ration being the device ID count divided by the network address day part device ID count; and compute as the retargeting probability the device ID ratio modified by a decay function according to the time elapsed from the most recent prior request for content replacement parts associated with the network address of the current client device.

* * * * *